(12) United States Patent
Bondy

(10) Patent No.: US 6,275,992 B1
(45) Date of Patent: Aug. 21, 2001

(54) EYE SHIELD ASSEMBLY

(75) Inventor: Dennis Michael Bondy, Windsor (CA)

(73) Assignee: Jamin' Sun Shaydes, L.L.C., Wixom, MI (US)

(*) Notice: Subject to any disclaimer, the term of this patent is extended or adjusted under 35 U.S.C. 154(b) by 0 days.

(21) Appl. No.: 09/612,902

(22) Filed: Jul. 10, 2000

Related U.S. Application Data

(60) Provisional application No. 60/153,938, filed on Sep. 15, 1999, and provisional application No. 60/148,063, filed on Aug. 10, 1999.

(51) Int. Cl.$^7$ ............................................... A61F 9/00
(52) U.S. Cl. ............................ 2/10; 2/209.13; 351/155
(58) Field of Search ............................. 2/10, 12, 13, 175.1, 2/195.1, 6.5, 6.7, 209.13, 453, 422, 424; 24/3.3, 3.12, 336; 248/316.7; 351/155, 158

(56) References Cited

U.S. PATENT DOCUMENTS

| | | |
|---|---|---|
| 2,519,959 * | 8/1950 | Fisher .................................... 350/276 |
| 2,648,091 * | 8/1953 | Jones ..................................... 2/171.1 |
| 4,063,740 * | 12/1977 | Mader .................................... 273/183 |
| 5,208,916 | 5/1993 | Kelman ..................................... 2/10 |
| 5,422,686 | 6/1995 | Kelman et al. ....................... 351/155 |
| 5,471,259 | 11/1995 | Cahill .................................... 351/155 |
| 5,533,208 * | 7/1996 | Tonoyan et al. .......................... 2/10 |
| 5,615,413 | 4/1997 | Bower ....................................... 2/10 |
| 5,687,420 * | 11/1997 | Chong ...................................... 2/10 |
| 5,778,448 * | 7/1998 | Maher ....................................... 2/10 |

* cited by examiner

Primary Examiner—John J. Calvert
Assistant Examiner—Katherine Moran
(74) Attorney, Agent, or Firm—Gifford, Krass, Groh, Sprinkle, Anderson & Citkowski, P.C.

(57) ABSTRACT

An eye shield assembly is provided for use in conjunction with a hat having a brim. The eye shield assembly includes a frame and a lens mounted to the frame. The opposite sides of the frame are pivotally secured to the hat brim so that the frame is movable between a storage position and an operational position. In its storage position, the lens nests closely adjacent to the brim while in the operational position, the lens depends generally perpendicularly downwardly from the brim.

5 Claims, 2 Drawing Sheets

EYE SHIELD ASSEMBLY

RELATED APPLICATIONS

This application claims priority of U.S. Provisional Patent Application 60/148,063 filed Aug. 10, 1999 and U.S. Provisional Patent Application 60/153,938 filed Sep. 15, 1999, which are incorporated herein by reference.

BACKGROUND OF THE INVENTION

I. Field of the Invention

The present invention relates generally to eye shields and, more particularly, to an eye shield which is detachably secured to the brim of a hat.

II. Description of the Prior Art

There have been a number of previously known eye shield assemblies, oftentimes tinted, which are attached to the brim of a hat. Such assemblies have been used not only in athletics, but also for casual wear. Some of these previously known eye shield assemblies, furthermore, have been pivotally mounted to the hat brim between the storage and an operational position.

These previously known eye shield assemblies, however, have not proven wholly satisfactory in use. One disadvantage of these previously known devices is that the eye shield assembly, even when in a storage position, obstructs the vision of the person wearing the hat since the eye shield assembly does not conform to the shape of the brim when in its storage position.

Additionally, some of these previously known devices have utilized a single connection point between the center of the frame for the eye shield assembly and the hat brim. In use, however, the eye shield assembly may become skewed relative to the person wearing the hat.

A still further disadvantage of these previously known devices is that the eye shield assembly was directly and permanently mounted to the hat brim. Consequently, the eye shield assembly could not be moved from one hat and to another.

SUMMARY OF THE PRESENT INVENTION

The present invention provides an eye shield assembly for use with a hat having a brim which overcomes all of the above-mentioned disadvantages of the previously known devices.

In brief, the eye shield assembly of the present invention comprises a frame and a lens mounted to the frame. The lens is optionally tinted to additionally function as a sunglass assembly.

The frame is pivotally mounted to the brim so that the frame is movable between a storage position and an operational position. In its storage position, the lens nests closely adjacent to and conforms to the shape of the brim, thus enabling unobstructed vision for the person wearing the hat. Conversely, in its operational position, the frame with its attached lens depends generally perpendicularly downwardly from the frame. In doing so, the lenses are positioned in series with the line of vision for the person wearing the hat.

In the preferred embodiment of the invention, the frame is attached to the brim by a pair of C clips which are detachably secured to the brim with one C clip on each side of the brim. A ball and socket joint is then provided between the eyeglass frame and each C clip to provide the pivotal connection between the brim and the frame.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
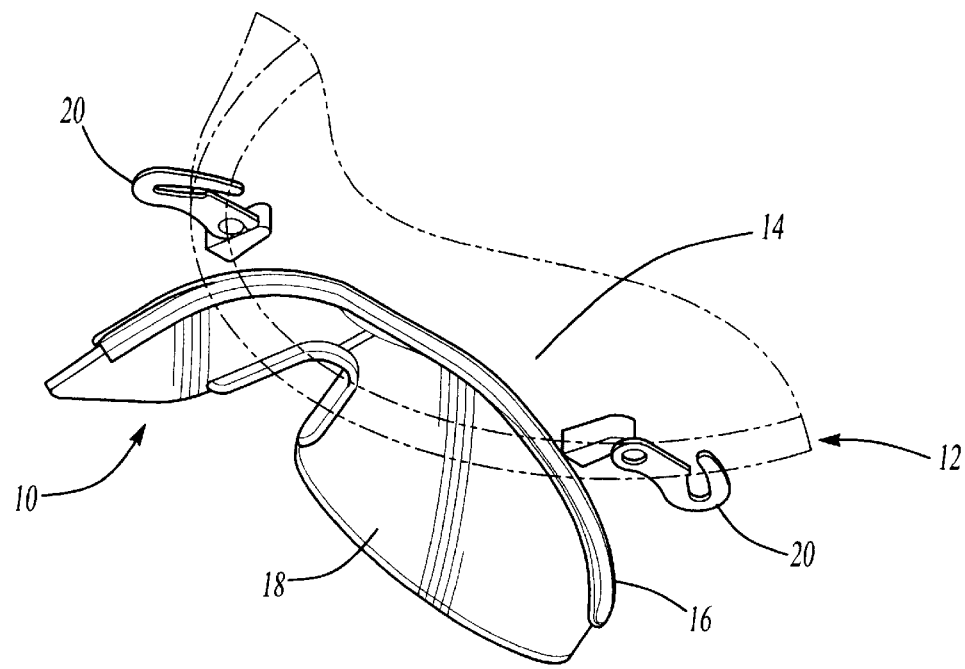
FIG. 1 is an elevational view illustrating a preferred embodiment of the present invention with the frame in the storage position.
Figure 2:
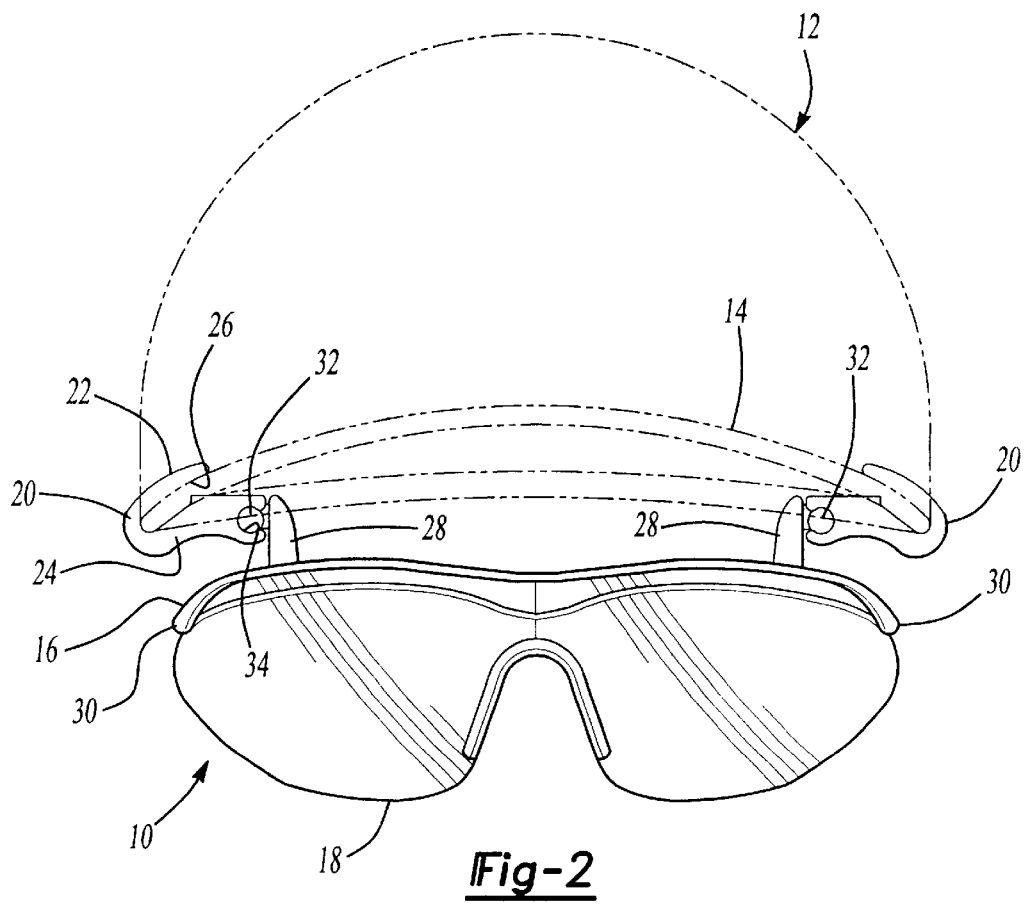
FIG. 2 is a front plan view of the preferred embodiment of the present invention illustrating the frame in a n operational position.

With reference first to FIGS. 1 and 2, a preferred embodiment of an eye shield assembly 10 is there shown for use with a hat 12 having a brim 14. As best shown in FIG. 2, the brim 14 has a generally concave shape and, when the hat 12 is worn, the brim 14 projects forwardly from the wearer's face.

The eye shield assembly 10 generally comprises a frame 16 which is preferably made of plastic. The frame 16 is secured to and supports a preferably concave transparent lens 18 in any conventional fashion. Furthermore, the lens 18 may optionally be tinted so that, when placed in the line of vision of the person wearing the hat, the lens 18 operates as a pair of sunglasses.

Still referring to FIGS. 1 and 2, in order to secure the frame 16 to the hat brim 14, the eye shield assembly 10 includes a pair of C clips 20. Each C clip 20 includes a pair of arms 22 and 24 such that a slot 26 is formed between the arms 22 and 24.

The slot 26 has a width less than the thickness of the brim 14. Furthermore, the clip 20 is made of a resilient material, such as plastic, so that the clips 20 are resiliently and detachably secured to opposite sides of the brim 14 as best shown in FIG. 2. In doing so, the arms 22 and 24 resiliently frictionally engage the top and bottom of the brim 14.

With reference now particularly to FIG. 2, the frame 16 includes a pair of spaced posts 28 which protrude upwardly from the top of the frame 16 so that one post 28 is positioned closely adjacent each lateral side 30 of the frame 16. The post 28 is preferably of a one-piece construction with the frame 16 and includes a ball 32. These balls 32, furthermore, face laterally outwardly from a center line of the frame 16 so that the balls 32 face away from each other.

Each ball 32, furthermore, is positioned within a spherical recess 34 in its associated C clip 20. Since the C clips 20 are preferably constructed of a resilient plastic material, the balls 32 may simply be press fit into the C clips 20.

Figure 3:
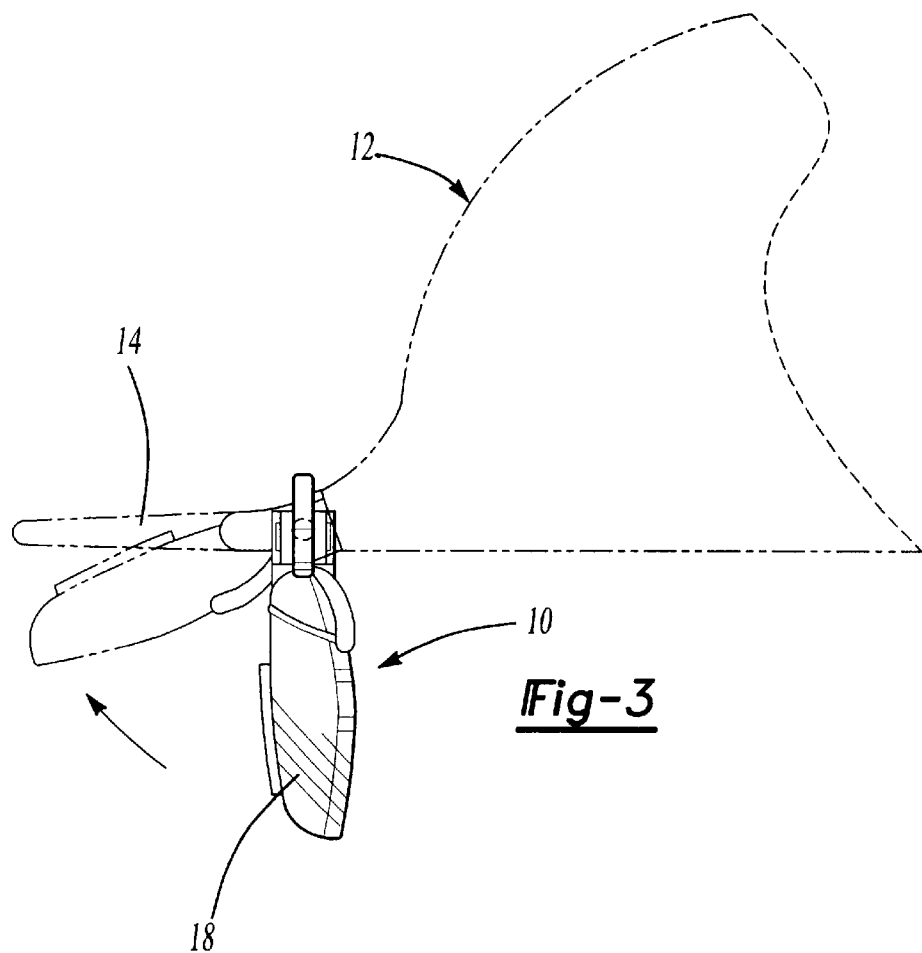
FIG. 3 is a side view illustrating the preferred embodiment of the present invention.
Figure 4:
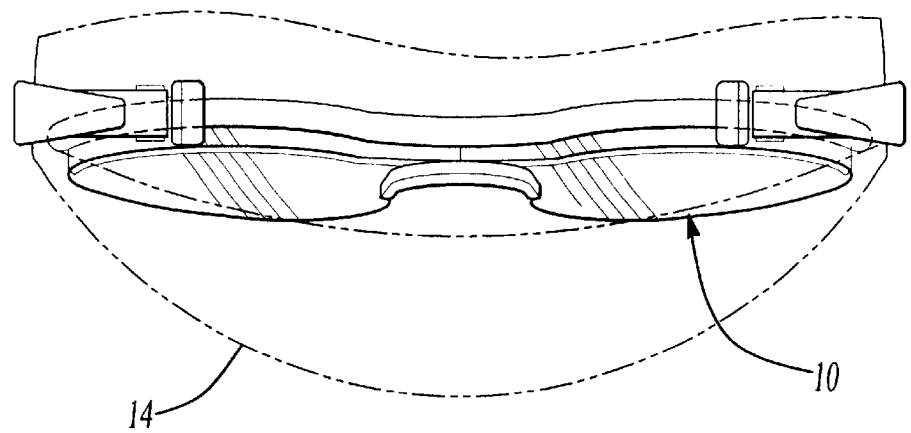
FIG. 4 is a top plan view illustrating the preferred embodiment of the present invention in an operational position.

With reference now particularly to FIGS. 3 and 4, the pivotal connection provided between the C clips 20 and the frame 16 by the ball 32 and socket 34 connection allows the eye shield assembly 10 to be moved between an operational position, illustrated in solid line in FIG. 3 and in FIG. 4, and a storage position, illustrated in phantom line in FIG. 3. In its storage position, the lens nests closely adjacent the bottom of the brim 14 thus allowing an unobstructed line of vision for the person wearing the hat 12. Conversely, with the eye shield assembly 10 in its operational position, the frame 16 together with its attached lens 18 depends generally perpendicularly downwardly from the bottom of the brim 14 and thus in series with the line of vision for the person wearing the hat 12.

In the preferred embodiment of the invention, the frame 16 and lens 18 are generally concave thus matching the concave shape of the brim 14. Thus, when the lens 18 is in its storage position, the contour of the lens 18 and frame 16 generally matches the concavity of the brim 14 thus allowing the lens 18 to generally flatly abut against the bottom of the brim. This further enhances the generally unobstructed line of vision for the person wearing the hat.

The eye shield assembly 10 may also be rapidly and easily moved from one hat to another.

From the foregoing, it can be seen that the present invention provides a simple, inexpensive and yet totally effective eye shield assembly for use with a hat having a brim. Having described my invention, however, many modifications thereto will become apparent to those skilled in the art to which it pertains without deviation from the spirit of the invention as defined by the scope of the appended claims.

I claim:

1. For use in conjunction with a hat having a brim, an eye shield assembly comprising:

a frame, a lens mounted to the frame, means for pivotally mounting said frame to the hat between a storage position and an operational position, wherein in said storage position said lens nests closely adjacent to the brim and wherein in said operational position said lens depends downwardly from the brim, wherein said pivotal mounting means comprises a pair of clips, each clip having ends, one clip being attached at said first end to one side of the brim, and the other clip being attached at said first end to the other side of the brim, said second ends of said clips each having a spherical socket so that said sockets face each other, a pair of posts secured to said frame so that one post is adjacent one end of said frame and the other post is adjacent the other end of said frame, each post having a spherical ball such that said spherical balls face away from each other and are dimensioned to be received in the socket in said clip adjacent said post.

2. The invention as defined in claim 1 wherein said clips are made of plastic.

3. The invention as defined in claim 1 wherein said lens is tinted.

4. The invention as defined in claim 1 wherein said lens includes ultraviolet blockers.

5. The invention as defined in claim 1 wherein said lens is generally concave in shape.

* * * * *